United States Patent [19]
Ball et al.

[11] 3,915,311
[45] Oct. 28, 1975

[54] METHOD AND APPARATUS FOR HANDLING LARGE, FRAGILE OBJECTS

[75] Inventors: Glen A. Ball, Peoria; Keith E. Koch, Tremont; Ivan R. Lamport, Peoria; Robert W. Untz, Hanna City, all of Ill.

[73] Assignee: Caterpillar Tractor Co., Peoria, Ill.

[22] Filed: Jan. 21, 1974

[21] Appl. No.: 434,983

[52] U.S. Cl................ 214/1 QD; 269/22; 294/93
[51] Int. Cl.²........................................ B65G 7/00
[58] Field of Search............ 214/1 Q, 1 QD, DIG. 4, 214/13 OR, 13 OC; 294/67 B, 67 BA, 93; 269/22

[56] References Cited
UNITED STATES PATENTS

| | | |
|---|---|---|
| 2,756,883 | 7/1956 | Schreck.................... 294/67 BA X |
| 2,873,996 | 2/1959 | McHugh, Jr........................ 294/93 |
| 3,253,851 | 5/1966 | Gilbert.......................... 294/67 BA |
| 3,680,715 | 8/1972 | Montgomery.................... 214/1 QE |

*Primary Examiner*—Frank E. Werner
*Attorney, Agent, or Firm*—Phillips, Moore, Weissenberger Lempio & Strabala

[57] ABSTRACT

Apparatus for handling a large object, i.e., for example, an annular core on which a tire carcass is to be formed, includes an annular wall positionable about the annular core, and a diaphragm associated with the inner surface of the wall and defining with the wall a chamber into which pressurized fluid may be directed. Such introduction of pressurized fluid expands the diaphragm so that such diaphragm comes into contact with and grips the core. The core may then be moved and/or turned over by manipulation of the wall.

3 Claims, 14 Drawing Figures

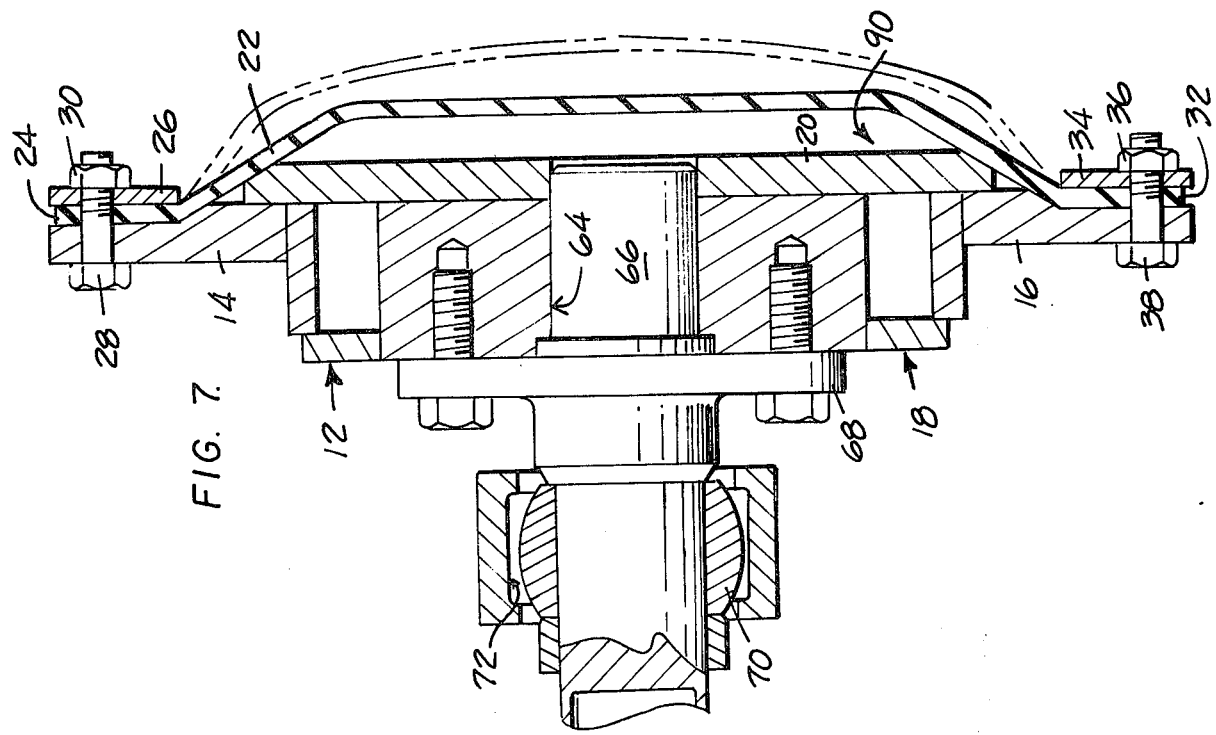
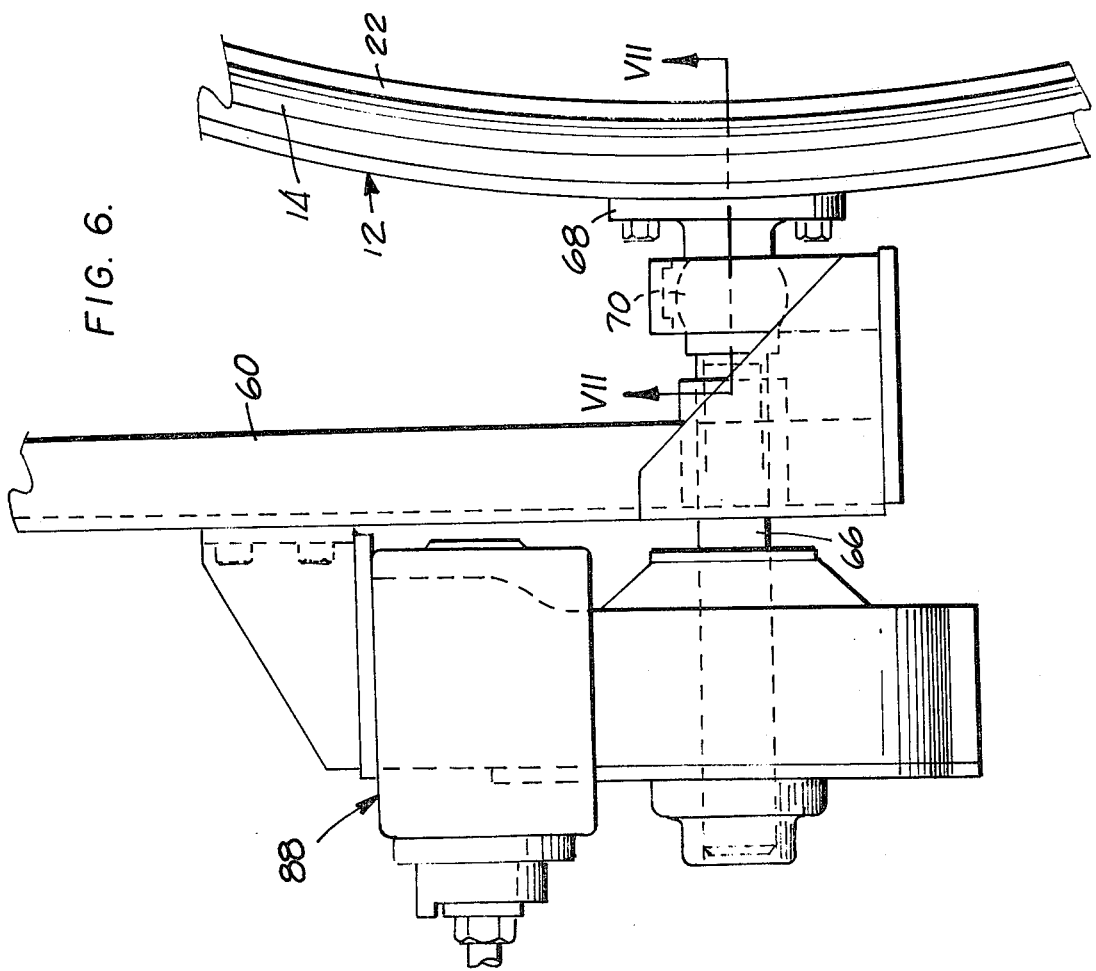

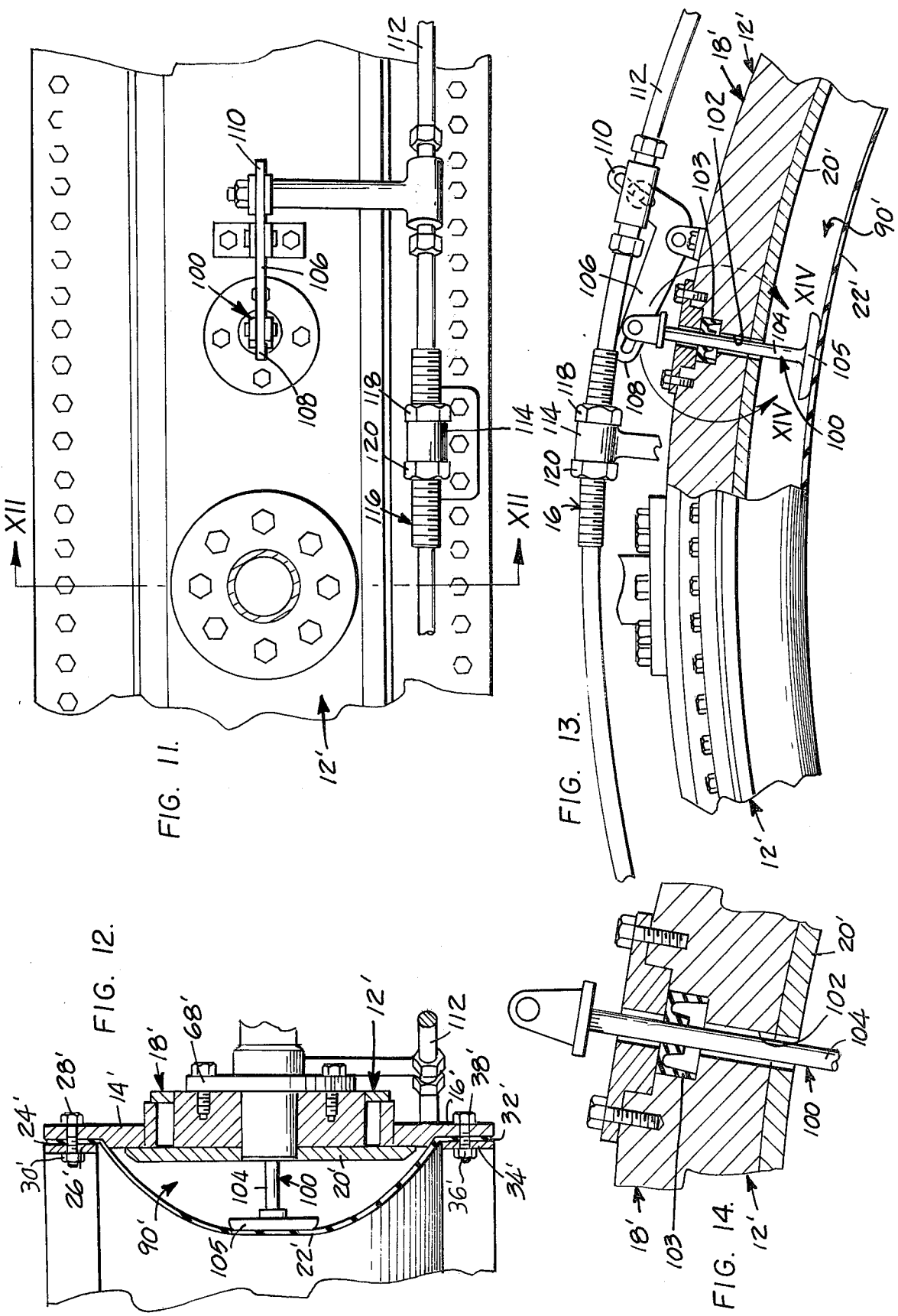

METHOD AND APPARATUS FOR HANDLING LARGE, FRAGILE OBJECTS

BACKGROUND OF THE INVENTION

This invention relates to method and apparatus for handling large, fragile objects, and more particularly, to such a method and apparatus which is particularly applicable to manipulating objects such as an annular tire core.

In the fabrication of tires of the type disclosed in U.S. Pat. No. 3,606,921 to Grawey (assigned to the assignee of this application), the carcass of the tire is formed on an extremely large and heavy, relatively fragile annular sand core. It will be understood that the handling of such core requires great care, so as to prevent damage thereto. Yet, relatively great forces must by necessity be applied to the core if it is to be moved.

SUMMARY OF THE INVENTION

It is accordingly an object of this invention to provide method an apparatus for handling objects, particularly relatively large and fragile objects, in a proper and efficient manner.

It is a further object of this invention to provide method and apparatus which, while fulfilling the above object, are applicable for use in handling a variety of objects.

Broadly stated, the apparatus disclosed herein comprises apparatus for selectively gripping an object, comprising wall means positionable about the object. Means are associated with the wall means and are movable inwardly thereof to engage a portion of the outer surface of the object to thereby grip the object, with the wall means so positioned. Means are included for selectively moving the movable means inwardly of the wall means. In such apparatus, the movable means may comprise diaphragm means, which may be moved inwardly of the wall means by application of fluid pressure therewithin. Broadly stated, the method of handling an object comprises positioning an annular wall generally about the object, moving a movable member associated with the wall inwardly thereof and toward the object to engage a portion of the outer surface of the object to thereby grip the object, and moving the wall to move the gripped object therewith.

BRIEF DESCRIPTION OF THE DRAWINGS

These and other objects of the invention will become apparent from a study of the following specification and drawings, in which:

FIG. 6 is a side elevation of a portion of the apparatus shown in FIG. 1, showing the support means associated with the one side of the wall means;

FIG. 7 is a sectional view taken along the line VII—VII of FIG. 6;

FIG. 11 is a side elevational view of a portion of the apparatus of FIG. 10;

FIG. 12 is a sectional view taken along the lines XII—XII of FIG. 11;

FIG. 13 is a plan view, partially in section of the portion of the apparatus shown in FIG. 11; and FIG. 14 is an enlarged view of the area XIV—XIV of FIG. 13.

DESCRIPTION OF THE PREFERRED EMBODIMENTS

Figure 1:
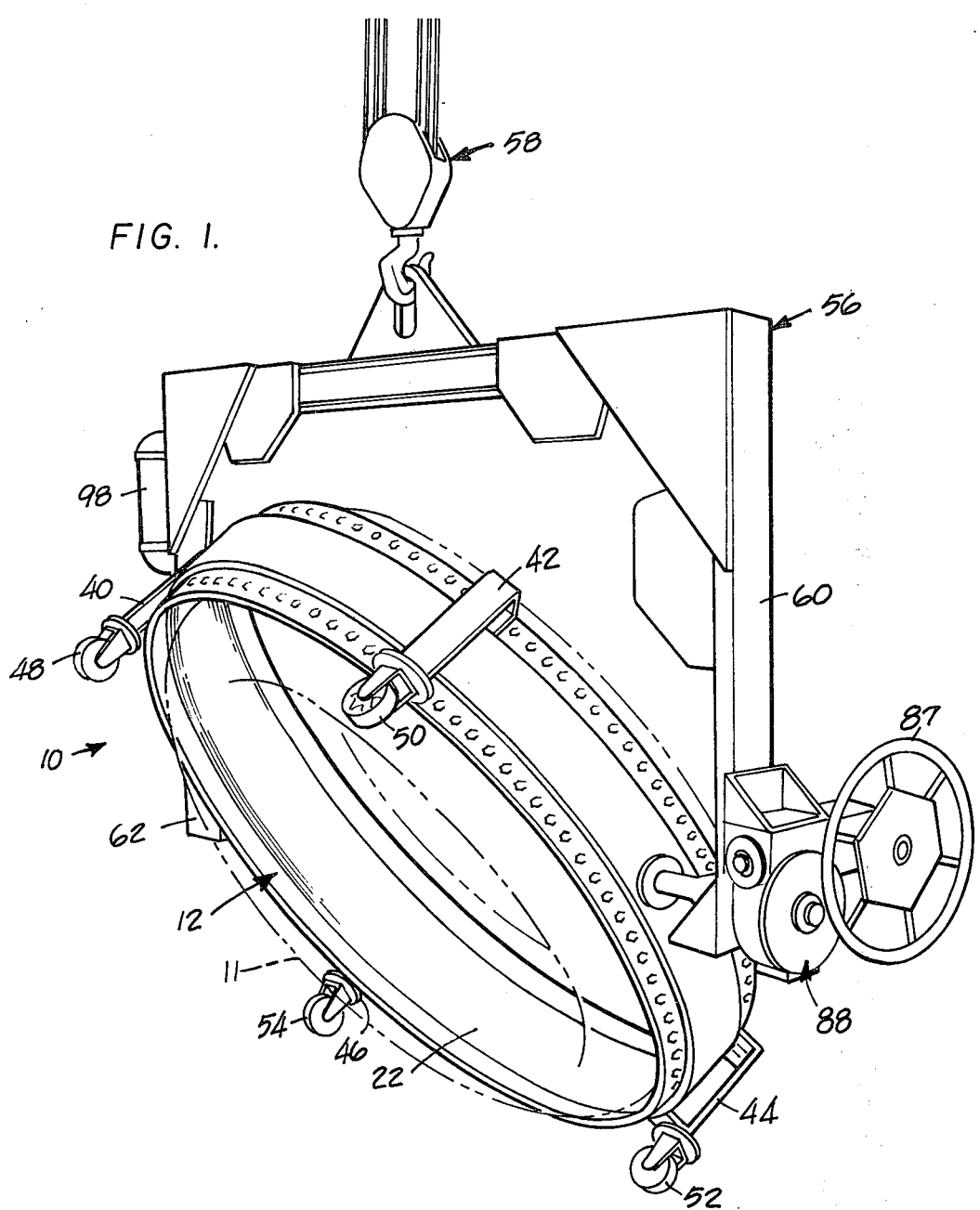
FIG. 1 is a perspective view of the overall handling apparatus.
Figure 5:
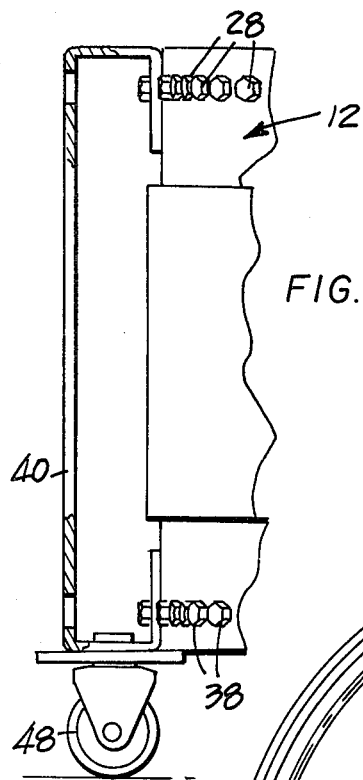
FIG. 5 is a side elevation, partially in section, of the portion of the wall means structure as shown in FIG. 4.
Figure 4:
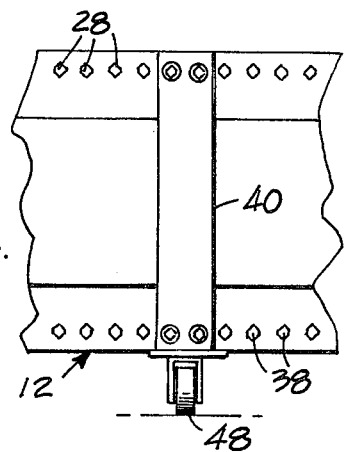
FIG. 4 is a view taken along the line IV—IV of FIG. 3.
Figure 3:
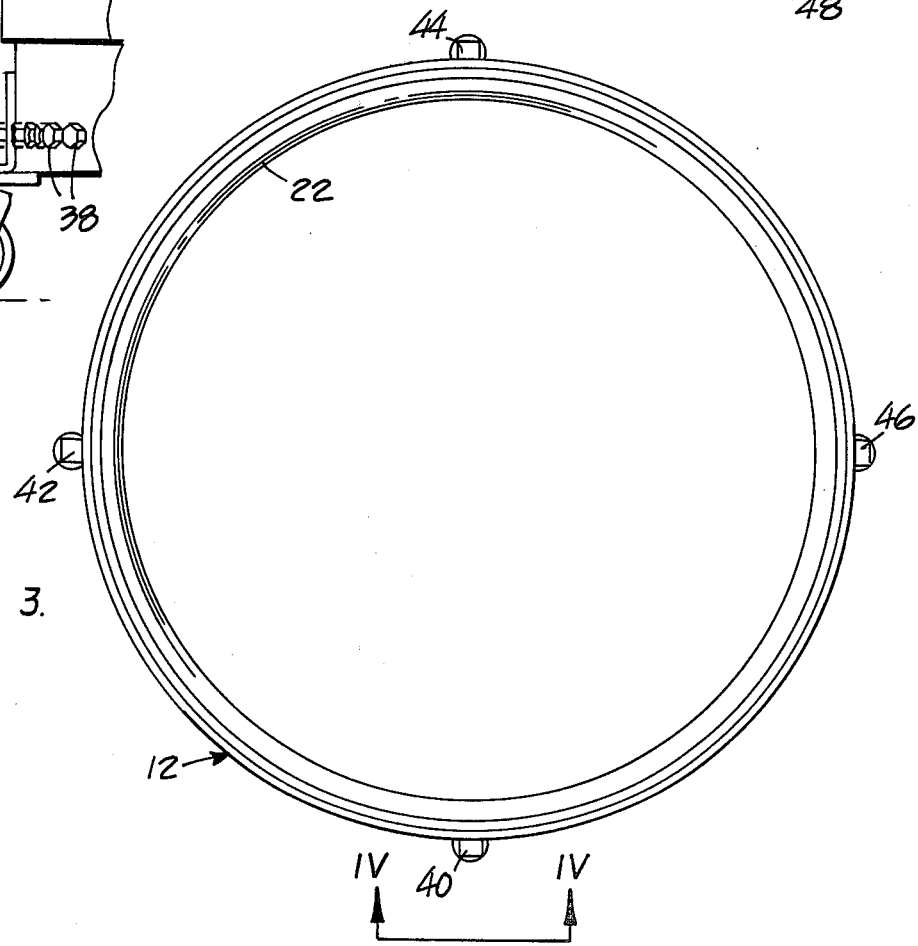
FIG. 3 is a plan view of the annular wall means as shown in FIG. 2.
Figure 2:
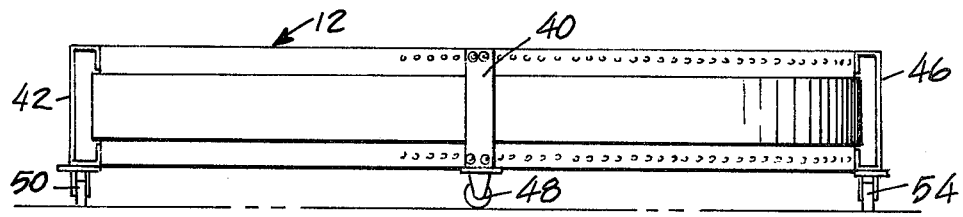
FIG. 2 is a side elevation of the annular wall means and associated structure of the apparatus.
Figure 8:
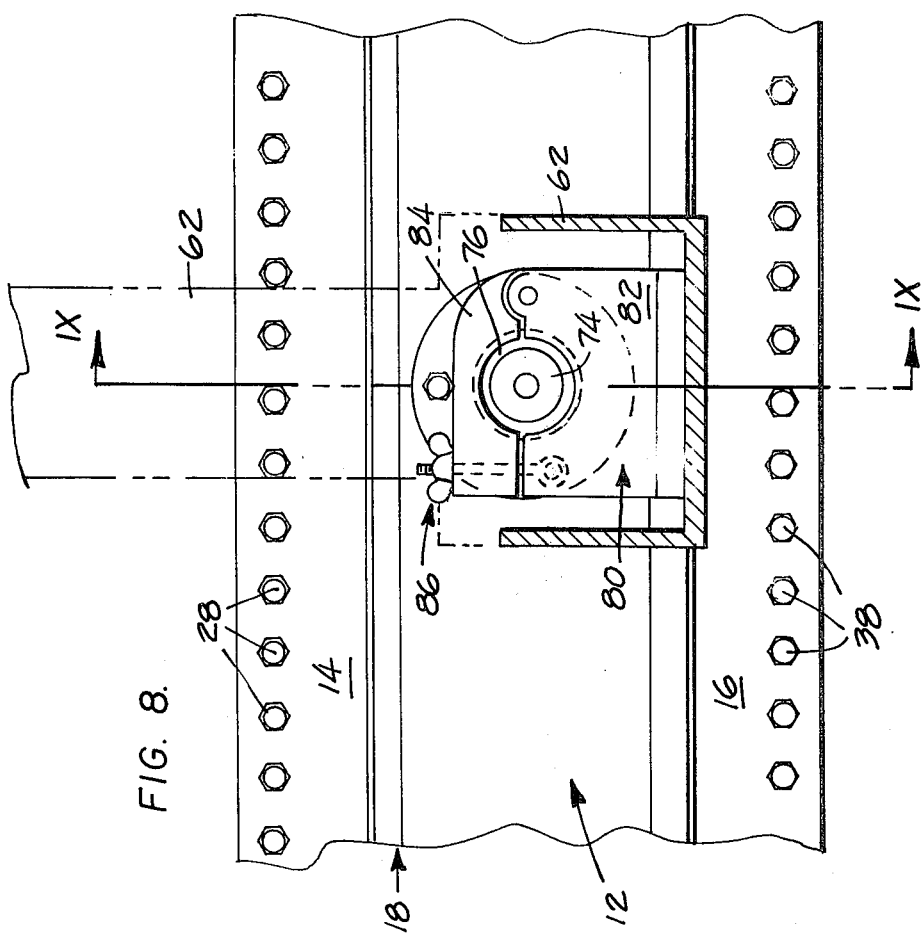
FIG. 8 is a front elevation of a portion of the apparatus as shown in FIG. 1, showing the support means associated with the other side of the wall means.
Figure 9:
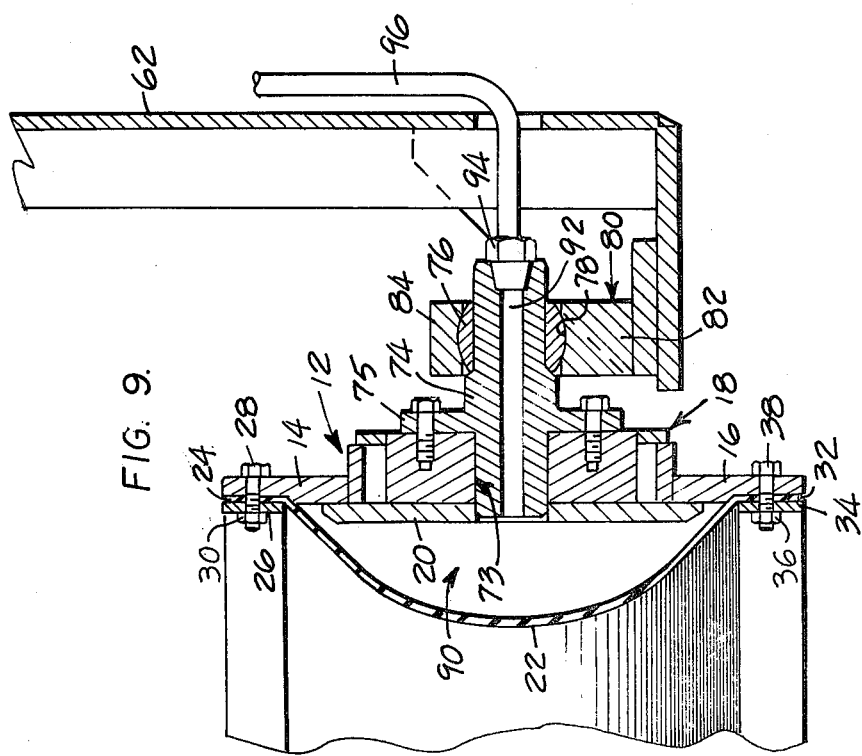
FIG. 9 is a sectional view taken along the line IX—IX of FIG. 8.
Figure 10:
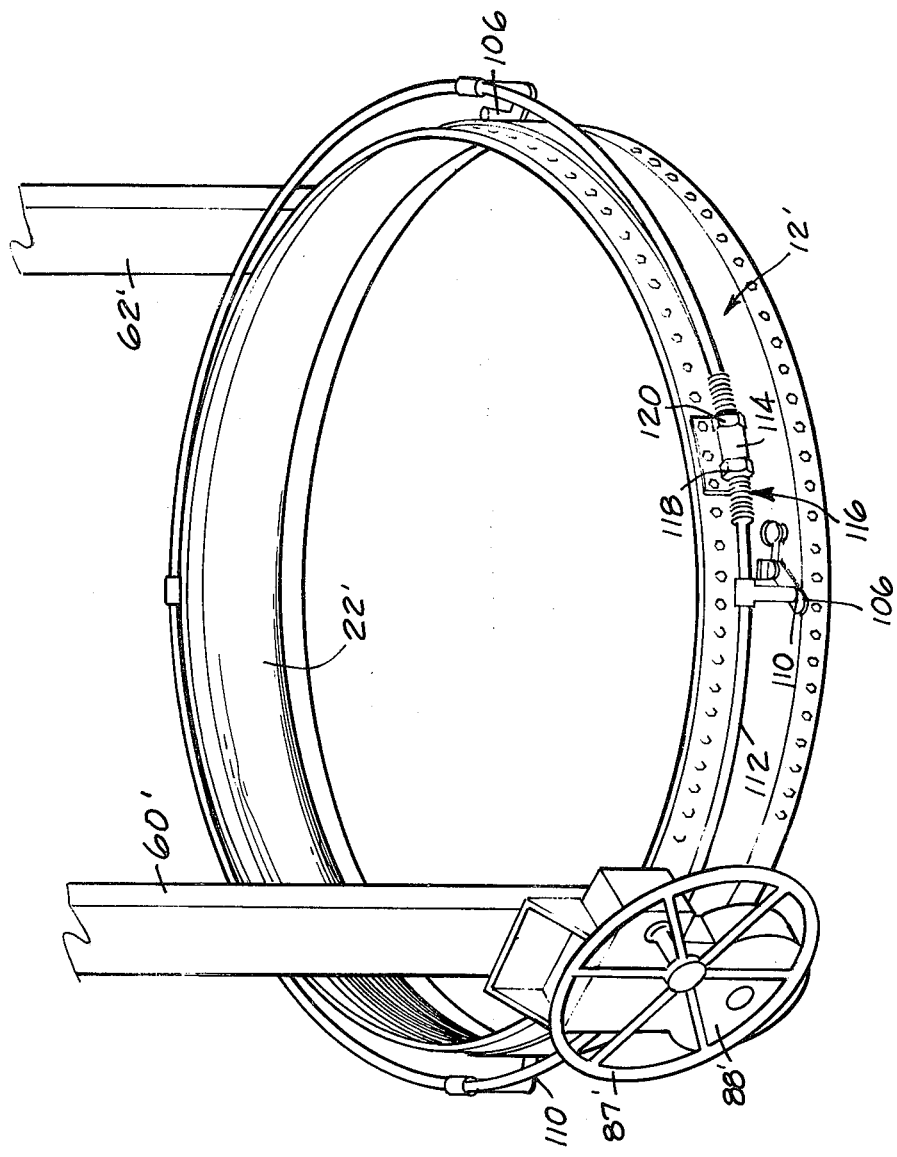
FIG. 10 is a perspective view of an apparatus similar to that shown in FIG. 1, but incorporating modifications thereto.

Shown in FIGS. 1-9 is a first embodiment of apparatus 10 for gripping and handling an object such as a toroidal core 11, as disclosed in the above-mentioned U.S. Pat. No. 3,606,921 to Grawey. The apparatus 10 includes annular wall means 12 which in turn are made up of upper and lower annular wall portions 14, 16, an intermediate annular wall portion 18 to which the wall portions 14, 16 are fixed as by welding, and an inner annular plate 20 fixed as by welding to the inner surfaces of the wall portions 14, 16.

An expandable annular diaphragm 22, of rubber or the like, is associated with the inner surface of the wall means 12. One edge portion 24 of the diaphragm 22 is seated continuously on the inner surface of the annular wall portion 14, and an annular ring 26 is positioned so that such edge portion 24 is disposed between the ring 26 and wall portion 14. Bolts 28 are disposed through appropriate apertures in the wall portion 14, edge portion 24, and ring 26, and nuts 30 are tightened on the bolts 28 to bring the edge portion 24 into continuous, substantially sealing relation with the wall portion 14. Similarly, the other edge portion 32 of the diaphragm 22 is disposed between the wall portion 16 and a ring 34, and nuts 36 are tightened on bolts 38 to move ring 34 to bring the edge portion 32 of diaphragm 22 into continuous, substantially sealing relation with the wall portion 16.

Certain of these nut and bolt assemblies are used to secure legs 40, 42, 44, 46 to the wall means 12, outwardly thereof, and rollers 48, 50, 52, 54 are rollingly secured to the bottom portions of the legs 40, 42, 44, 46 respectively, such rollers 48, 50, 52, 54 being disposed outwardly of the outer surface of the wall means 12. Through such legs and roller means, the assembly 10 may be moved relatively easily when such assembly 10 is disposed on, for example, a floor, the rollers 48, 50, 52, 54 and legs 40, 42, 44, 46 acting to support such apparatus 10 in such state.

In the state shown in FIG. 1, the wall means 12 are supported on either side by means shown in FIGS. 6–9. A support assembly 56 is shown as itself supported, and raisable and lowerable, and further movable, by means of a block and tackle assembly 58. The support assembly 56 includes downwardly extending first and second support members 60, 62 which are positioned on opposite sides of the wall means 12. The wall portion 18 and plate 20 define a bore 64 into which the end of a pin 66 is disposed, the pin 66 being fixed relative thereto by means of the body of a flange 68 which is bolted to the wall portion 18, such flange 68 being fixed relative to the pin 66. A ball member 70 is secured to the pin 66, and seats in a socket 72 defined by the support member 60. The wall portion 18 and plate 20 also define a bore 73 opposite the bore 64 with which a pin 74 and flange 75 structure, similar to the previously described pin and flange structure, is associated. A ball member 76 is secured to the pin 74, and seats in a socket 78 defined by a block member 80 which is part of the support member 62. The block member 80 is made up of a lower portion 82 and an upper portion 84 pivotally connected thereto. The upper portion 84 may be secured to the lower portion 82 by means of wing nut and bolt structure 86, but may be pivoted relative thereto outwardly thereof to allow removal of the pin 74 from the support member 62. The bolts securing flange 68 to wall portion 18 may then be removed so that the wall means 12 and diaphragm 22 may be removed from the support members 60, 62, if so desired.

The pins 66, 74 are aligned along a diameter of the annular wall means 12, so that the wall means 12 may be rotated generally about such a diametrical axis. Means in the form of a wheel 87 and gear reduction system 88 are used to rotate the pin 66, to in turn rotate the wall means 12 and diaphragm 22 when desired.

The pin and flange structures, and the wall portions 14, 16, 18 as so secured together, define, with the diaphragm 22, an annular chamber 90. The pin 74 defines a longitudinal bore 92 therewithin which communicates with the chamber 90. The outer end of such bore 92 communicates by means of a rotatable joint 94 with an air line 96 connected to a supply tank 98 (FIG. 1) containing pressurized air. The tank 98 is in turn fixed to the support member 62.

In the use of the apparatus 10, the wall means 12 may be raised or lowered by means of block and tackle assembly 58 to a chosen height, and may be rotated through rotation of the support assembly 56 about a vertical axis, as is well known in the use of such a block and tackle assembly 58. The wall means 12 and diaphragm 22 are also rotatable, by means of the wheel 87, about the diametrical axis defined by the longitudinal axes of pins 66, 74. The wall means 12 and diaphragm 22 may thereby be positioned until the annular wall means 12 are positioned about an object, such as the previously described core 11. Pressurized air is then supplied to the chamber 90 by means of a well-known valve (not shown) to move the expandable diaphragm 22 inwardly of the wall means 12 to engage the outer surface of the object and grip the object. The object may then be lifted by means of the block and tackle 58 lifting the wall means 12, and the wall means 12 may be rotated about a vertical axis, and also about such diametrical axis, to change the orientation of the object, or to, for example, turn such object over, if so desired.

Such embodiment as thus described has proven to be capable of properly and safely handling an extremely heavy core 11 of the type disclosed above. For example, it has been found that, with 2½ psi air pressure in the diaphragm 22, the apparatus 10 is easily capable of handling a core which weighs 2,000 pounds. Furthermore, with 3 psi air pressure in the diaphragm 22, the apparatus 10 can safely and properly handle a core 3,000 pounds in weight. Meanwhile, because of the use of such diaphragm 22, it will be understood that the outer surface of the core which is being gripped is contacted in a manner such that damage will not occur thereto.

The apparatus shown in FIGS. 10–14 is similar to that previously described, but includes a variation thereto for aiding in providing stability of the object as it is being moved. In the embodiment of FIGS. 10–14, a plurality of plungers 100, each including a stem 104 and a head 105, are positioned about the annular wall means 12, and are reciprocable within respective bores 102 defined by the wall portion 18' and plate 20' of the wall means 12'. Seal means 103 are associated with the stem 104 of each plunger 100 and the wall means 12', so that each such stem 104 is in sealing relation with the wall means 12', insuring that pressurized air introduced into the chamber 90' defined by the wall means 12' and diaphragm 22 will not escape therethrough. A plurality of link members, one shown at 106, are each pivotally fixed relative to the wall means 12', between the ends 108, 110 of such link member 106. One end 108 of each link member 106 is pivotally connected to a plunger 100 outwardly of the wall means 12', and the other end 110 is pivotally connected relative to an annular hoop member 112 which is disposed about the wall means 12'. The hoop member 112 is supported relative to the wall means 12' by a plurality of extending arms 114, each defining a bore through which the hoop member 112 extends. It will be seen that rotation of the hoop member 112 about the wall means 12' in one direction moves the plungers 100 inwardly of the wall means 12', moving the heads 105 toward the object to be gripped, and rotation of the hoop member 112 about the wall means 12' in the other direction moves the plungers 100, and heads 105 therewith, away from the object.

Such rotation of the hoop member 112 in said directions may be achieved through the means best shown in FIGS. 11 and 13. As shown therein, one portion 116 of the hoop member 112 is threaded, and is disposed through one of the extending arms 114. Nuts 118, 120 are threadably engaged with the threaded portion 116, and are disposed on either side of the extending arm 114. It will be seen that, upon loosening of one of the nuts 118, 120 by rotation thereof to move it away from the extending arm 114, the other nut may be rotated relative to the threaded portion 116 to draw such threaded portion 116 and hoop member 112 through the bores in the extended arms 114 in one direction. Upon positioning of the hoop member 112 where chosen, the one nut may be tightened down on the extending arm 114 to lock the hoop member 112 in place. It will also be understood that the process may be reversed, using the opposite nuts in the same manner, to achieve rotation of the hoop member 112 in the other direction, and securing of the hoop member 112 in the chosen position after such rotation.

Such plungers 100 may thus selectively be moved to move the diaphragm 22' inwardly of the wall means 12', independent of such air pressure previously described. Portions of the diaphragm 22', through such mechanical means, may be brought into engagement with portions of the outer surface of an object disposed within the wall means 12', so that the object is gripped thereby. Such movement of the plungers 100, of course, takes place through the movement of the hoop member 112 may then be rotated in the opposite direction, again as described above, to move the plungers away from the object. The use of such plungers 100 in addition to pressurized fluid in such bladder 22' results in the advantage that an extremely high degree of stabilization of the object can be achieved, such stabilization not being achievable through the use of the inflatable diaphragm 22' alone, because it will be seen that the diaphragm 22' alone, being of resilient material, and being filled with air, could move or shake to an extent as the object itself is being moved. The mechanical plunger means described above provides an extremely high degree of stability, meanwhile with the diaphragm means providing most of the object carrying force of the apparatus.

What is claimed is:

1. Apparatus for selectively gripping a fragile object comprising:
   rigid wall means positionable generally about the object;
   diaphragm means having edge portions associated with the inner surface of said wall means, said diaphragm means defining with said wall means an annular chamber and movable inwardly of the wall means to engage a portion of the outer surface of said object to thereby grip the object with the wall means so positioned;
   clamp means for sealingly retaining the edge portions of the diaphragm means between the wall means and the clamp means; and
   fluid pressure means for selectively moving said diaphragm means inwardly of said wall means.

2. The apparatus of claim 1 wherein the clamp means comprise annular ring means.

3. Apparatus for selectively gripping a fragile object comprising:
   rigid wall means positionable generally about the object;
   diaphragm means associated with said wall means and defining with said wall means an annular chamber and movable inwardly of the wall means to engage a portion of the outer surface of said object to thereby grip the object, with the wall means so positioned;
   fluid pressure means for selectively moving said diaphragm means inwardly of said wall means;
   means for supporting the wall means on either side thereof, comprising;
   first and second support members disposed on opposite sides of the wall means; and
   means interconnecting the first support member and wall means and second support member and wall means, for allowing the wall means to be rotated generally about a diametrical axis thereof; one of the support members defining a bore communicating with the annular chamber and through which fluid pressure may be applied to the chamber.

* * * * *